(12) United States Patent  (10) Patent No.: US 8,171,788 B2
Ahlstrom  (45) Date of Patent: May 8, 2012

(54) BAROMETRIC PORTABLE ELECTRONIC DEVICE

(75) Inventor: Mikko Ahlstrom, Helsinki (FI)

(73) Assignee: Suunto Oy, Vantaa (FI)

( * ) Notice: Subject to any disclaimer, the term of this patent is extended or adjusted under 35 U.S.C. 154(b) by 330 days.

(21) Appl. No.: 12/649,902

(22) Filed: Dec. 30, 2009

(65) Prior Publication Data

US 2010/0170337 A1 Jul. 8, 2010

(30) Foreign Application Priority Data

Dec. 31, 2008 (FI) ...................................... 20086258

(51) Int. Cl.
*G01L 7/20* (2006.01)
(52) U.S. Cl. ......................................................... 73/384
(58) Field of Classification Search .................. None
See application file for complete search history.

(56) References Cited

U.S. PATENT DOCUMENTS

| 4,938,195 | A | * | 7/1990 | Miyazaki et al. | ............... | 123/488 |
| 5,178,010 | A | * | 1/1993 | Holzel | ............................. | 73/384 |
| 5,224,059 | A | * | 6/1993 | Nitta et al. | ....................... | 73/384 |
| 7,142,152 | B2 | * | 11/2006 | Burgett et al. | ................. | 342/120 |
| 7,345,956 | B2 | * | 3/2008 | Matthey | ........................... | 368/11 |
| 2002/0032539 | A1 | * | 3/2002 | Tsuji | .............................. | 702/139 |
| 2007/0266783 | A1 | * | 11/2007 | Saporito et al. | ................. | 73/384 |
| 2009/0217754 | A1 | * | 9/2009 | Binda et al. | ..................... | 73/384 |

FOREIGN PATENT DOCUMENTS

| JP | 5-11070 A | 1/1993 |
| JP | 5-281367 A | 10/1993 |
| JP | 10-20047 A | 1/1998 |

* cited by examiner

*Primary Examiner* — Andre Allen
(74) *Attorney, Agent, or Firm* — Birch, Stewart, Kolasch & Birch, LLP

(57) ABSTRACT

The invention relates to a device and method for measuring atmospheric pressure and processing atmospheric-pressure information. The invention is based on the idea that the atmospheric pressure is measured at several moments in time, the atmospheric-pressure data is stored in a memory and, and the measured atmospheric-pressure data is displayed on a display unit with the aid of special atmospheric-pressure indicators (12) using a graph, one axis of which corresponds to time and the other axis to atmospheric pressure. In addition, a reference indicator (14), which comprises at least one sloping line, is arranged on the display unit. According to the invention, the atmospheric-pressure indicators are scaled in such a way that a temporal change in atmospheric pressure of the magnitude of a specific predefined constant causes the consecutive atmospheric-pressure indicators (12) to be set in the graph parallel to the said sloping line.

12 Claims, 3 Drawing Sheets

BAROMETRIC PORTABLE ELECTRONIC DEVICE

The present invention relates to the measurement of atmospheric pressure in portable devices, such as wristop computers. In particular, the invention relates to the processing and transmission of atmospheric-pressure information to the user of the device, in such a way that the user can react to substantial changes taking place in atmospheric pressure.

The measurement of atmospheric pressure has become one of the basic functionalities of wristop computers intended for use in outdoor sports. Atmospheric pressure is measured with the aid of an atmospheric-pressure sensor. Atmospheric-pressure data is utilized when determining altitude and monitoring the prevailing weather conditions. Forecasts of future weather conditions can also be made based on changes in atmospheric pressure. One problem when monitoring weather conditions is that the reading given by the sensor is affected not only by the actual atmospheric pressure according to the weather, but also by the altitude of the sensor. For example, in the air layers close to the surface of the ground, a rise of 8 meters in altitude signifies a reduction in atmospheric pressure of about 1 hPa (1 mbar). This is the same order of magnitude as the change in atmospheric pressure in one hour due to a major change in weather. Thus, for example, the automatic issuing of a weather alert notifying of an approaching storm, based on the rate of change of atmospheric pressure, is simple only if the altitude of the device does not change. In the case of portable devices, this is often not possible. If the altitude of the device changes, its ambient atmospheric pressure will also change, which interferes with the evaluation of changes in atmospheric pressure arising from the development of the weather.

It is possible to try to distinguish the usually rapid changes in atmospheric pressure arising from changes in altitude from the slower changes in atmospheric pressure arising from weather conditions. Rapid changes in atmospheric pressure are then interpreted as being due to changes in altitude, and not as being due to a change in weather, which leads to a difficult contradiction with the algorithm regulating the issuing of a 'storm alert' like that described above.

The above problematics have been dealt with in, for instance, U.S. Pat. No. 6,678,629, in which it is sought to use a simple pressure signal to distinguish between a change in pressure caused by a normal variation in atmospheric pressure and a change in the reading of a barometer that is caused by the movement of the user of a mobile device, such as a wristop computer. Though this solution also has good features, problems with the accurate behaviour of the device are caused, on the one hand, by variations in atmospheric pressure arising from rapid changes in weather conditions and, on the other hand, from changes due to movement, which are not sufficiently rapid to be distinguished from variations in atmospheric pressure.

Of course, a change in atmospheric pressure due to movement can be distinguished from changes in atmospheric pressure caused by changes in weather with the aid of additional sensors, such as acceleration sensors or magnetic sensors, but these solutions increase the complexity and costs of the device. One solution of this type is disclosed in FI patent publication 119297, in which pressure data is measured and used as atmospheric-pressure data and to determine altitude, while a magnetic sensor is used to measure the earth's magnetic field. Consecutive measurements are performed using the magnetic sensor, the consecutive measurements are compared with each other and, on the basis of the comparison, the mobile device is set to either atmospheric-pressure measurement or to altitude measurement, or the desired altitude is set for the mobile device. While the solution described is highly suitable for the automatic calibration of altitude measurement, it does not solve the problem relating to the evaluation of the significance of variations in weather.

U.S. Pat. No. 7,324,002 discloses a method for issuing an automatic weather alert. In the method, the atmospheric-pressure data is determined repeatedly while the altitude data is determined repeatedly and simultaneously with the atmospheric-pressure data, with the aid of a satellite-positioning system. With the aid of the altitude data, changes in the altitude of the device can be taken into account and thus a weather alert caused by changes in atmospheric pressure can be issued more reliably. The method is reliable, but requires a GPS receiver to be incorporated in the device, thus making the device more complex and expensive and also significantly increasing the device's power consumption.

The invention is intended to create a new type of device and method, with the aid of which it will be easier than before for the user to evaluate the significance of variations in weather. The invention is also intended to create a device and method that are simpler but nevertheless more reliable than known solutions, based on an automatic weather alert, for detecting changes in weather.

The invention is based on the idea of measuring the atmospheric pressure at several moments in time, recording the atmospheric-pressure data in a memory, and displaying the measured atmospheric-pressure data on a display unit with the aid of special atmospheric-pressure indicators, using a graph, one axis of which corresponds to time and the other axis to atmospheric pressure. In addition, the display unit is fitted with a reference indicator, which comprises at least one sloping line. The atmospheric-pressure indicators according to the invention are scaled in such a way that a temporal change in atmospheric pressure of the magnitude of a specific predefined constant causes the consecutive atmospheric-pressure indicators to be set on the graph parallel to the said sloping line. Thus, the atmospheric-pressure indicators are scaled relative to the measured atmospheric pressure, in such a way that a rate of change in atmospheric pressure of the magnitude of a predefined constant corresponds to the angular coefficient of the reference indicators. The constant can be set to correspond, for example, to the typical rate of change in atmospheric pressure predicting the arrival of a storm.

More specifically, the device and method according to the invention is characterized by what is stated in the characterizing portions of the independent Claims.

Considerable advantages are gained with the aid of the invention. First of all, the invention entirely eliminates the need for an automatic weather alert, as a user of the device can, with the aid of it, in practice easily visually estimate the significance of changes in atmospheric pressure. By allowing users of the device themselves to easily visually examine whether an important boundary value of the change in atmospheric pressure has been exceeded, the problem situations relating to automatic algorithms are avoided, and the complexity, cost, and power consumption of the device can be significantly reduced.

One important advantage of the invention is that, with the aid of it, a user can better utilize their own experience and memories when explaining changes in atmospheric pressure. The user's own movement, which includes a significant change in altitude, will appear in the atmospheric-pressure graph as a steep jump. Thus, the user can easily filter out in their mind changes that are not due to weather changes and evaluate the significance of only a change in weather, with the aid of the line or set of lines of the reference indicators. As described in greater detail above, in known solutions changes that are not due to a change in weather have had to be identified either purely computationally, which causes reliability problems, or by increasing the complexity and measurement components of the device, which incurs costs and increases power consumption. The present invention also offers a possibility for evaluating the significance of atmospheric-pressure variations that have taken place in the past.

In the following, embodiments of the invention are examined in greater detail, with reference to the accompanying drawings.

With reference to FIGS. 1a-1d, according to one embodiment of the invention, in a graphical presentation of the atmospheric pressure the real-time atmospheric pressure can be seen at the right-hand edge and the atmospheric pressures of the preceding 12 hours in columns from right to left. The examples show one column for each hour, but naturally, the time resolution can be greater or smaller. It is easy to see from the presentation how the atmospheric pressure has changed during the last few hours, which is essential information when evaluating the development of the weather.

Figure 1A:
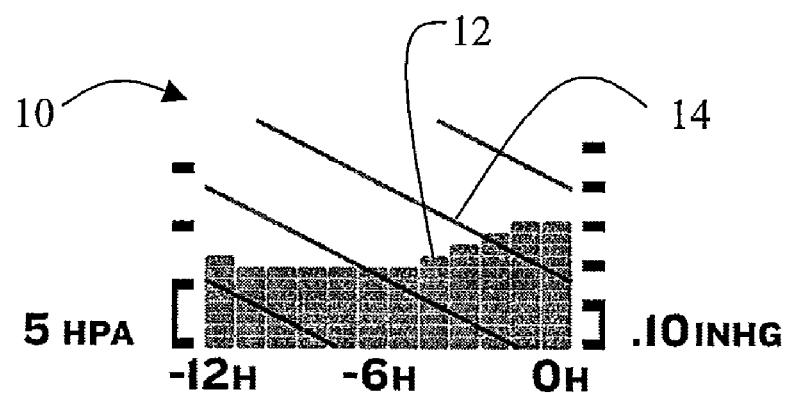
FIGS. 1a-1d show views of the display unit in the case of different atmospheric-pressure histories, when scaling of the atmospheric-pressure indicators has been implemented according to the invention.

With reference to FIG. 1a, the atmospheric-pressure indicator graph 10 is marked with the reference number 12. A reference indicator 14 is fitted on top of the graph and, in the examples of FIGS. 1a-1d consists of four parallel lines, the angle of slope of which corresponds to a change in atmospheric pressure of about −1.4 hPa/1 h. This rate of change has been observed to be a good boundary value for a 'storm alert', which can be given when, based on the rate of change of the atmospheric pressure, there is reason to expect a significant change in the weather. If the atmospheric-pressure indicators 12 and a set of such sloping lines are implemented on top of each other in the graph, the user of the device can examine the development of the atmospheric pressure against this boundary value when evaluating the significance of the development of the atmospheric pressure.

The boundary value for the change in atmospheric pressure, according to which the atmospheric-pressure indicators are scaled, can be a constant set in the device at the factory, or it can be defined by the users themselves. The constant corresponds to the rate of change in atmospheric pressure typically preceding an area of low pressure or a storm, and is preferably ←1.0 hPa/h, typically −1.0--10.0 hPa/h, particularly −1.0--3.0 hPa/h.

According to a preferred embodiment, the device comprises a user-interface element, with the aid of which the graph view can be moved backwards in time. The user-interface element can be, for example, a rotatable roller or button. Atmospheric-pressure changes can then be examined from a wider area of the time span of the graph, for example, for the last 24 or 48 hours. According to an alternative embodiment, rotating the roller corresponds to the scaling of the time-step scale, allowing a narrower or wider time span than that of the original view to be shown on the display. Naturally, the roller-type user-interface element can be replaced, for example, with a press button, or with some other known solution.

The atmospheric-pressure indicators can comprise, as in FIGS. 1a-1d, a column-type indicator, the height of the top of which shows the magnitude of the atmospheric pressure (column graph), a point-like indicator (point graph), or, for example, a line (line graph) connecting the atmospheric pressures to each other. All of these graph types have in common the fact that they include several indicators corresponding to time points on the time axis, the locations of which in the direction of the pressure axis of the graph are directly proportional to the magnitude of the measured pressure.

According to one embodiment, the development of the atmospheric pressure is shown with the aid of one or several consecutive lines or arrows, in which case the start and finish of the line or arrow must be understood as the consecutive atmospheric-pressure indicators, which thus define the slope of the line. The indicators need not necessarily be distinguished quite as clearly as in the accompanying illustrations, but one skilled in the art will understand that, in this respect, the invention can be implemented in very varying ways.

The reference indicator can be passive, in which case its position relative to the display unit and the display face of the entire device is fixed, or active, in which case its position or shape on the display can be altered electronically, for example, to correspond to the various value areas of the axes of the graph. Instead of continuous display, the reference indicator can also be implemented in such a way that it can be made visible only when desired, through a suitable user-interface element. The display can also be implemented using any technique whatever known to one skilled in the art, preferably as a pixel-based or otherwise element-based display, implemented, for example, using LCD, TFT, or (O)LED technology.

The fixed reference indicator can be implemented, for example, with the aid of a membrane, which includes a set of lines but is otherwise transparent, fitted on top of the device's display. Of, course, the set of lines can be arranged directly on the surface of the display unit, or even on the protective glass of the device's display face. For its part, the implementation of the active reference indicator can be based on pixels.

The reference indicator preferably comprises at least two, and typically at least three parallel lines arranged on the graph. These can comprise, for example, a line for low atmospheric pressure, i.e. arranged on the left-hand lower part of the graph, a line for average atmospheric pressure, i.e. arranged in the central area of the graph, and a line for high atmospheric pressure, i.e. arranged on the right-hand upper part of the graph. According to a preferred embodiment, the distance of the lines from each other parallel to the pressure axis is at least 10 hPa and/or the distance of the lines from each other parallel to the time axis is at most 8 h. This ensures that any significant change in atmospheric pressure occurring in the time range will be easily and rapidly seen from the display unit, i.e. that the distance between the measured atmospheric-pressure indicators and the reference indicators will always remain reasonable in terms of visual comparison.

The reference indicator is typically shown in its entirety on top of the atmospheric-pressure indicators and differs from them in colour, in order to facilitate recognition.

Figure 2:
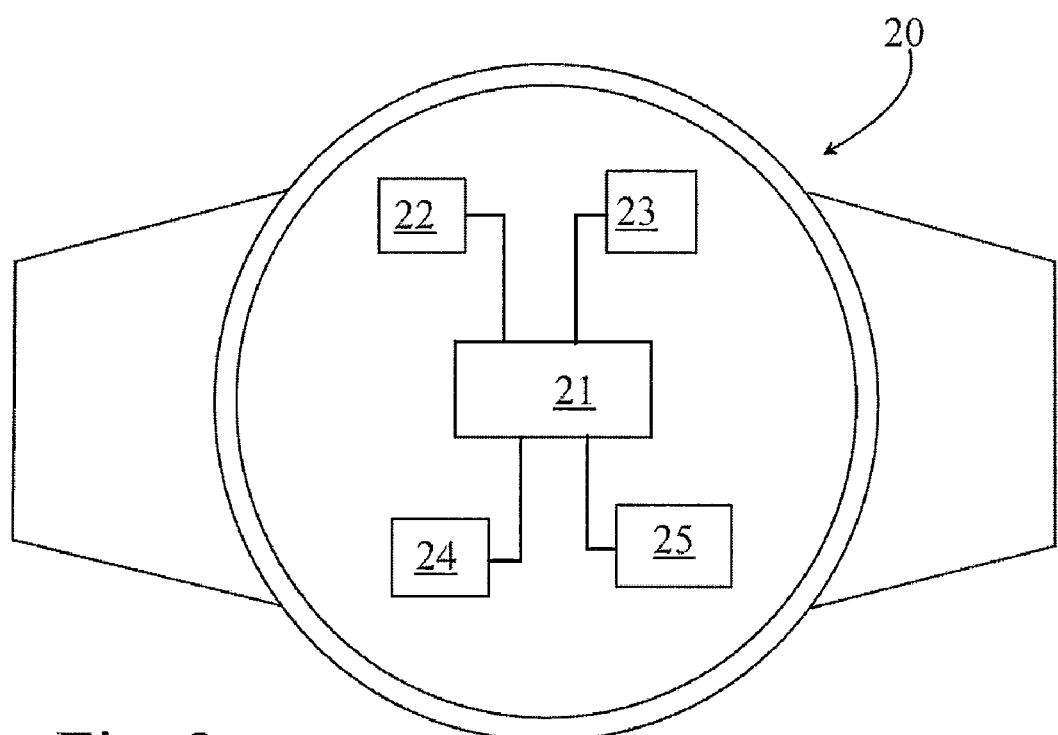
FIG. 2 shows a schematic drawing of a wristop computer according to one embodiment of the invention.

FIG. 2 shows a wristop device 20, which comprises a processor, i.e. control unit 21, as well as an atmospheric-pressure sensor 22 connected operationally to the control unit 21, a memory unit 23, a clock circuit 24, and a display unit 25. The control unit 21 reads atmospheric-pressure data from the atmospheric-pressure sensor 22 at programmed intervals of, for example, 1-60 minutes, with the aid of the clock circuit 24, and records them in the memory unit 23, in space that is free or is becoming free. The memory unit comprises storage space for at least ten, typically several hundred, atmospheric-pressure data units. The device can also be programmed to calculate mean values from earlier atmospheric pressures and record mean-value data, instead of individual measurements, in the memory unit 23, in order to improve measuring accuracy and/or to save storage space. The atmospheric-pressure data can be scaled, according to the invention, for determining the position/altitude of the atmospheric-pressure indicator of the display unit 25, before either it is stored in the memory unit 23, or only after it is retrieved from the memory unit 23 for visualization of the atmospheric-pressure data. When the user selects, with the aid of the device's user-interface element(s) (not shown), the atmospheric-pressure data visualization state, the control unit 21 draws the atmospheric-pressure indicators for the last few hours, scaled according to the invention, on the display unit 25, as well as, if necessary, the line or lines of the reference indicators on top of the atmospheric-pressure indicators. After this, the significance of the rate of change in atmospheric pressure can be seen immediately on the display unit 25.

Instead of a wristop device, the device can be some other mobile device, such as a mobile telephone or portable weather station.

The following describes in greater detail the backgrounds and interpretation of the atmospheric-pressure histories of FIGS. 1a-1d:

FIG. 1a: the atmospheric pressure has risen slightly over the last 6 hours.

Figure 1B:
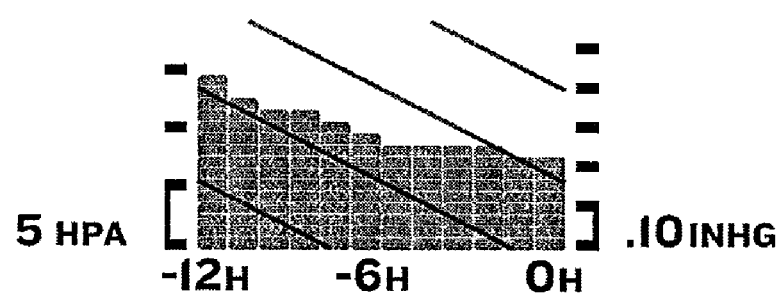

FIG. 1b: the atmospheric pressure dropped quite quickly, but then evened out.

Figure 1C:
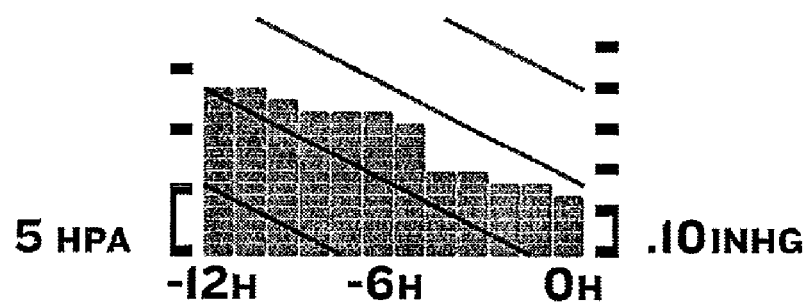

FIG. 1c: a sudden drop can be seen in the development of the atmospheric pressure, but the user recalls having driven by car from one place to another about 4 hours ago, which explains the time of the change.

Figure 1D:
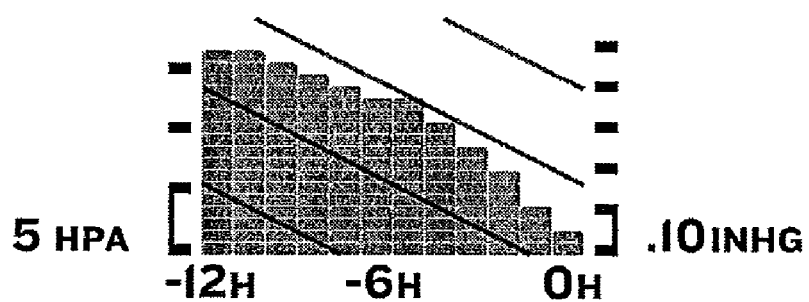

FIG. 1d: the atmospheric pressure has dropped more steeply than the reference line over the last four hours, while the user has not traveled anywhere at this time, so that a sudden change in weather may be expected.

As one skilled in the art will understand, the invention has several variations and can be implemented in ways differing from the above embodiment descriptions. The above description and examples, or the accompanying drawings are thus not intended to restrict the scope of protection of the invention, which is defined in the accompanying Claims. The Claims must be interpreted to their full extent, taking the equivalence interpretation into account.

The invention claimed is:

1. Portable electronic device (20) comprising
an atmospheric-pressure sensor (22) for measuring atmospheric pressure, a memory unit (23) for recording atmospheric pressures recorded at several moments in time,
a display unit (25), and
a control unit (21) for displaying simultaneously the magnitudes of atmospheric pressures recorded at several times as a graph on the display unit, which comprises adjacent atmospheric-pressure indicators (12) corresponding to several different moments in time,
characterized in that
the display unit (25) is arranged to display an atmospheric-pressure indicator (14), which comprises at least one line at a slope relative to the main axes of the graph and arranged on the graph, and
the control unit (21) is arranged to scale the atmospheric-pressure indicators (12) relative to the measured atmospheric pressure in such a way that a rate of change in the measured atmospheric pressure, of the magnitude of a predefined constant, will cause the atmospheric-pressure indicators (12) to be set on the graph parallel to the said sloping line.

2. Electronic device according to claim 1, characterized in that it is a wristop computer.

3. Electronic device according to claim 1, characterized in that the said predefined constant corresponds to the rate of change in atmospheric pressure preceding a typical area of low pressure or a storm, being preferably ←1.0 hPa/h, typically −1.0−−10.0 hPa/h, particularly −1.0−−3.0 hPa/h.

4. Electronic device according to claim 1, characterized in that the reference indicator (14) comprises at least two, preferably at least three parallel lines arranged on the graph.

5. Electronic device according to claim 4, characterized in that the reference indicator comprises
at least one line arranged at a low atmospheric-pressure level,
at least one line arranged at an average atmospheric-pressure level, and
at least one line arranged at a high atmospheric-pressure level,
the distance between the lines parallel to the pressure axis being preferably at most 10 hPa.

6. Electronic device according to claim 4, characterized in that distance parallel to the time axis of the lines of the reference indicator (14) is at most 8 h.

7. Electronic device according to claim 1, characterized in that the device comprises a user-interface element or elements, such as a roller or press-button, and the control unit (21) is arranged in response to the use of the user-interface element(s) to retrieve from the memory unit (23) atmospheric-pressure data that are older and/or newer in time, and to display them on the display unit (25).

8. Electronic device according to claim 1, characterized in that the reference indicator (14) is arranged to always be visible on top of the atmospheric-pressure indicators (12).

9. Electronic device according to claim 1, characterized in that the reference indicator (14) is of a different colour to that of the atmospheric-pressure indicators (12).

10. Electronic device according to claim 1, characterized in that the atmospheric-pressure indicators (12) comprise adjacent columns, separate points, or points connected to each other with the aid of lines, preferably on a pixel-based or otherwise image-element-based display unit (25).

11. Electronic device according to claim 1, characterized in that the reference indicator (14) is fixed relative to the display face of the device.

12. Method for measuring atmospheric pressure and processing atmospheric-pressure data in a portable electronic device (20), in which method
atmospheric pressure is measured with the aid of an atmospheric-pressure sensor (22),
temporally consecutive atmospheric-pressure data are recorded in a memory unit (23),
the temporally consecutive atmospheric-pressure data are displayed simultaneously on a display unit (25) with the aid of atmospheric-pressure indicators (12) arranged adjacently corresponding to several different moments in time,
characterized in that
the said graph is used to show, in addition, an atmospheric-pressure reference indicator (14), which comprises at least one line at a slope relative to the main axis of the graph and arranged on the graph, and
the atmospheric-pressure indicators (12) are scaled relative to the measured atmospheric pressure in such a way that a rate of change in the measured atmospheric pressure, of the magnitude of a predefined constant, causes the atmospheric-pressure indicators (12) to be set on the graph parallel to the said sloping line.

* * * * *